Feb. 2, 1954  C. H. DAVIES ET AL  2,668,029
AIRCRAFT CONTROL COLUMN
Filed Dec. 6, 1949  3 Sheets-Sheet 1
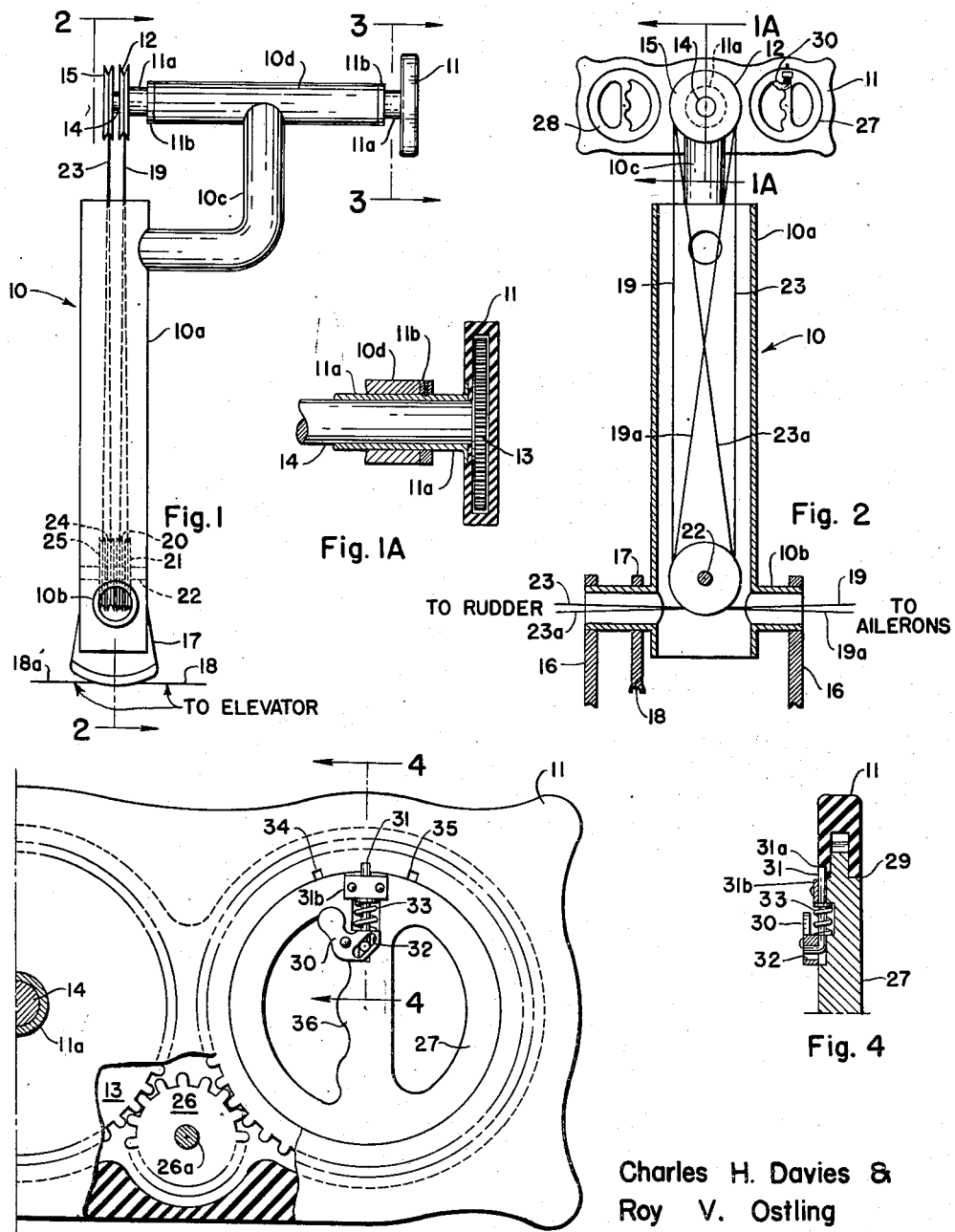
Charles H. Davies &
Roy V. Ostling
    INVENTORS.
BY  *James M. Clark*
THEIR PATENT ATTORNEY.

Charles H. Davies &
Roy V. Ostling
            INVENTORS

BY *James M. Clark*

THEIR PATENT ATTORNEY

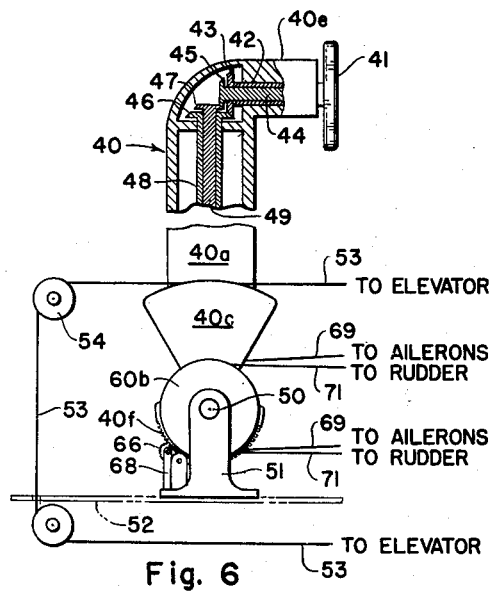
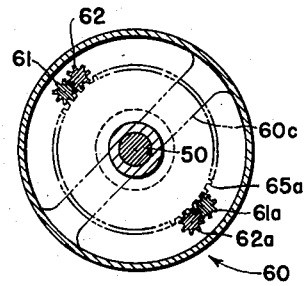
Fig. 9
Fig. 6
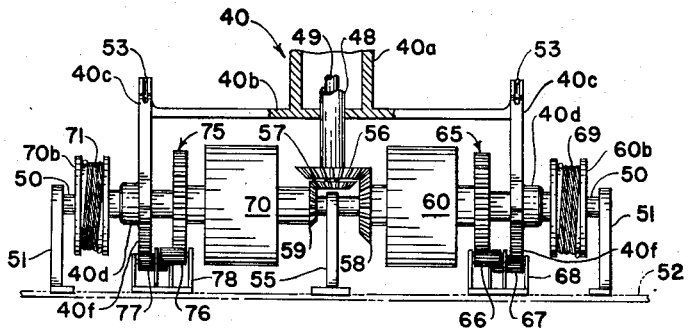
Fig. 7
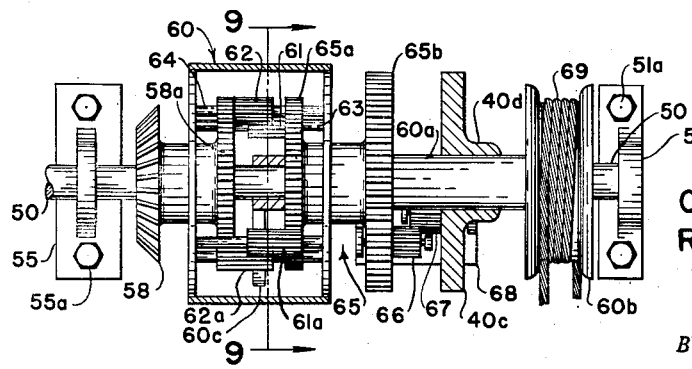
Fig. 8
Charles H. Davies &
Roy V. Ostling
INVENTORS Patented Feb. 2, 1954

2,668,029

UNITED STATES PATENT OFFICE 2,668,029

AIRCRAFT CONTROL COLUMN

Charles H. Davies and Roy V. Ostling, Seattle, Wash., assignors to Boeing Airplane Company, a corporation of Delaware Application December 6, 1949, Serial No. 131,312

14 Claims. (Cl. 244—83)

The present invention relates to control means and more particularly to improvements in control columns for aircraft and other vehicles.

In the conventional aircraft control system, the three control instrumentalities of the aircraft are usually controlled from both a manual hand-operated control stick or column, and a pedal or foot-operated rudder control. In these conventional control systems, the hand-operated control stick or column is normally utilized for controlling the elevators and ailerons, and the rudder bar or pedal is utilized for controlling the rudder, or steering control.

Control means has heretofore been proposed and utilized wherein the normal three control instrumentalities have been reduced to two instrumentalities, either by combining two of the control instrumentalities or by eliminating one of these instrumentalities to thereby provide what has become known as a two-control system. Arrangements have also been suggested and utilized in which a normal three-control system is readily convertible into a two-control system. The present invention relates more particularly to improvements in control columns in which all three control instrumentalities are controllable from a single improved control column and also embodies means whereby the three control column may be readily converted into a two-control column. It also incorporates improved means for coordinating the two combined controls and also embodies improved means for readily changing the ratio of coordination of the two combined control instrumentalities.

It is, accordingly, a major objective of the present invention to provide an improved control column for aircraft and other vehicles. It is a further object to provide a control column by means of which all three control instrumentalities of the aircraft or other vehicle are simultaneously controlled by the operation of a single column control means. It is a further and corollary objective of this invention to provide an improved control column which dispenses with the necessity for conventional rudder pedals or rudder bar, for the steering control. It is a further object to simplify the control column for aircraft by combining in the one control means the controls for all three control instrumentalities of an airplane.

It is a further object of this invention to provide means whereby all the controls of an airplane are confined to manual or hand controls as distinguished from pedal or foot-operated controls. It is another object to provide a control column which is selectively changeable at will from a two-control to a three-control system. A further objective resides in the provision of improved means associated with a control column for obtaining a coordinated movement of both the rudder and ailerons of an airplane. A further and supplementary objective resides in providing means for selectively changing the ratio of coordination between the aileron and the rudder controls. A still further object resides in the provision of such an improved control column which is adapted for use in a cable control system and a further supplementary objective resides in the provision of a gear-operated modification of the improved control means with which all of the above recited objectives are also obtainable.

Other objects and advantages of the present invention will become apparent to those skilled in the art after reading the following description taken in conjunction with the accompanying drawings, forming a part hereof, in which:

Fig. 1 is a side elevational view of a preferred form of the improved control column arranged for cable operation;

Fig. 1A is an enlarged cross-sectional view of the control arm portion of the control column as taken along the lines 1A—1A of Fig. 2;

Fig. 2 is a partly sectioned elevational view of the control column as taken along the lines 2—2 of Fig. 1;

Fig. 3 is an enlarged view of the elements comprising the control arm as taken along the lines 3—3 of Fig. 1;

Fig. 4 is a detail cross-sectional view of the coordinating latch element as taken along the lines 4—4 of Fig. 3;

Fig. 6 is a side elevational view, partly cross-sectioned, of a modified form of the improved control column in which the control forces are transmitted by gearing to the control cables;

Fig. 7 is a front elevational view of the gearing and associated mechanism at the base of the column shown in Fig. 6;

Fig. 8 is an enlarged partly sectional view of the aileron portion of the actuating mechanism shown in Fig. 7; and Fig. 9 is a cross-sectional view through a differential gearing unit as taken along the lines 9—9 of Fig. 8.

Figure 5:
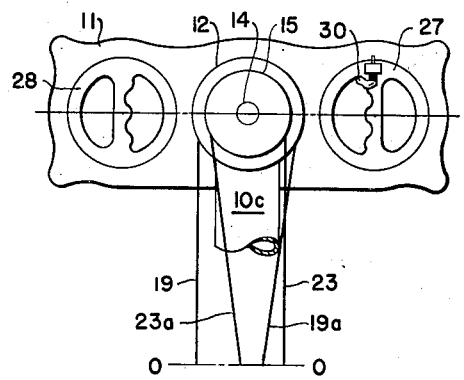
Fig. 5 is a diagrammatic view of the control column of Fig. 1 in its neutral position.

Referring now to Fig. 1, the numeral 10 illustrates a control column of generally tubular construction comprising an upright column portion 10a, and a transversely extending pivoted base portion 10b about which the column is adapted to rock in a fore and aft direction. The control column 10 also includes a rearwardly and upwardly extending bracket or arm portion 10c supporting a longitudinally extending fore and aft tubular head portion 10d. A control arm 11 suitably constructed of plastic or like material is contoured for manual gripping by a pilot or other operator and has an integrally attached forwardly extending tubular portion 11a which is suitably journalled for rotation within the tubular column portion 10d. Longitudinal movement of the control arm 11 and its attached quill shaft 11a is prevented by means of the collars 11b which are attached to the shaft 11a and engage the end faces of the tubular column portion 10d. The forward terminal of the control shaft 11a has fixedly attached thereto the cable sheave 12, which may be rotated in either direction by corresponding lateral rocking movement of the control arm 11 about the axis of the shaft 11a. As more particularly shown in Figs. 1A and 3, within the hollow central portion of the control arm 11, there is mounted a central spur gear 13 which is integral with the forwardly extending control shaft which is journalled for rotation with respect to the surrounding quill shaft 11a. On the forward terminal of the control shaft 14, there is fixedly mounted a cable sheave 15 of a similar size and type as the sheave 12 which is adjacently supported from the hollow shaft 11a.

The base portion 10b of the control column is mounted for fore and aft rocking movement about the journals provided within the supporting structure 16, and the base portion 10b has fixedly attached thereto the elevator control sector 17 to which the two runs of the elevator cables 18 and 18a are attached. The elevator, accordingly, is operated in a conventional manner by rocking the control column 10 about the axis of its base portion 10b. The abovementioned sheave 12 is engaged by the cable 19, one run of which extends vertically downwardly within the tubular column portion 10a to engage the sheave 20 and the adjacent run 19a of the cable extends downwardly and laterally to engage the same side of the adjacent sheave 21, these sheaves being jointly mounted for pivotation about the common fore and aft extending pivot 22.

The cables 19 and 19a extend laterally through the base portion 10b of the control columns to the aileron operating mechanism. Similarly the sheave 15 is engaged by the cable 23, the vertical run of which extends around the sheave 24 and the adjacent cable run 23a extends downwardly and laterally around the adjacent edge of the sheave 25. The sheaves 24 and 25 are also mounted for rotation about the common pivot 22 and the cables 23 and 23a extend outwardly to the rudder operating mechanism. Within the control arm 11 and on each side of the central gear 13, there is pivotally mounted a smaller idler gear 26 rotatable upon the pivot 26a, each idler gear in turn being meshingly engaged with the outer hand-controlled wheel gears 27 and 28, as shown in Figs. 2 and 3. It will, accordingly, be noted that fore and aft rocking of the control column 11 causes operation of the elevator in the conventional manner and that rotation of the shaft 11a causes corresponding movement of the ailerons while rotation of the inner shaft 14 imparts corresponding rotation to the rudder surface. It will be understood that the remainder of the operating portion of the control system may be of any conventional type and such mechanism is so well known that it is not necessary to describe the same herein beyond the respective control cables which extend to the operating portions of the system and the respective control surfaces.

As shown in Fig. 4, the hand-operated wheel gears 27 and 28 are provided with shouldered portions 29 which bear outwardly against the inner face of the circular openings in the control arms 11 within which they are journalled for rotation in meshing engagement with the idler gears 26 and the central gear 13. One of the hand operated gear wheels, such as 27, is provided with a trigger type lock 30 which is normally engaged to prevent relative rotation between the gear wheel 27 and the control arm 11. It will be obvious that it is only necessary to lock one of the gear wheels to the control arm inasmuch as this will accordingly prevent rotation of the opposite gear wheel through the intermediate idler gearing and the central gear 13. The trigger 30 operates the latch pin 31 supported within the guide 31b through engagement with the camming slot 32, being normally projected into its engaged position by the coil spring 33. The latch pin 31 is shown in Figs. 3 and 4 in engagement with the central notch or hole 31a within the shoulder portion 29 of the control arm 11 which is also provided with laterally spaced notches 34 and 35 with which the pin 31 may alternately be selectively engaged. The hand wheel gear 27 is provided with a single central spoke 36 which is suitably formed to provide a hand grip member upon which the trigger lock 30 is mounted for convenient operation by the thumb or fore finger of the pilot, and the opposite hand wheel 28 is provided with a similar symmetrically disposed hand grip portion.

Figure 5A:
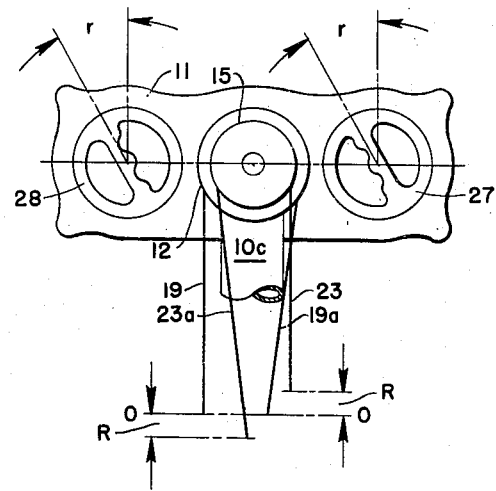
Fig. 5A is a similar view of the same corresponding to a displaced position of the rudder control.
Figure 5C:
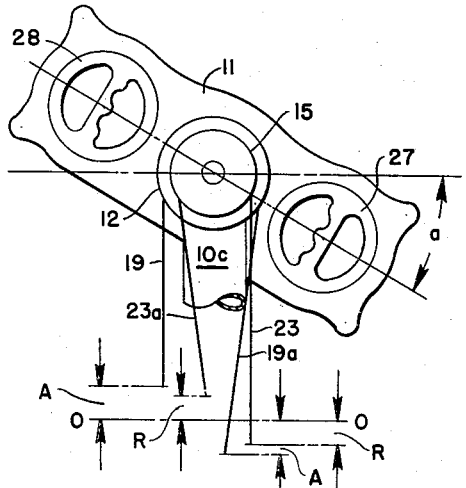
Fig. 5C is a similar view of the same corresponding to a coordinated displacement of both the rudder and aileron instrumentalities.
Figure 5B:
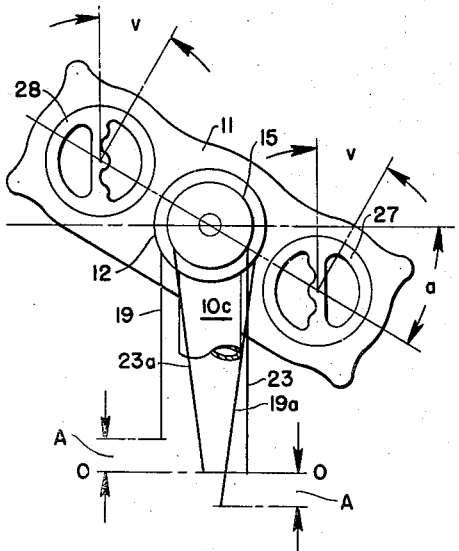
Fig. 5B is a similar view of the same corresponding to a displaced position of the ailerons.

Referring now to Fig. 5 for the operation of the aileron and rudder controls, it will be noted that this figure together with Figs. 5A, 5B and 5C are diagrammatic showings similar to the upper portion of Fig. 2, except that the outer or forward sheave 15, engaged by the rudder control cables 23 and 23a, has been shown for purposes of clarity as of a smaller diameter than the aileron control sheave 12. It will accordingly, be obvious that whereas this would change the ratio of coordinated movement between the aileron and the rudder, the change may be compensated for by providing a correspondingly smaller sheave or control arm at the other end of the operating cables in order that the ratio may be maintained.

The aileron cables 19 and 19a, are moved by rocking the entire control arm or head about the axis of the shaft 14, and the rudder control cables 23 and 23a are controlled by operating the hand wheel units 27 and 28 without moving the control arm 11 and all of these cable leads are shown diagrammatically as being cut along the datum line indicated at O—O. Accordingly, the aileron and rudder control means are shown in Fig. 5 in their neutral position in which the corresponding control surfaces would also be in their neutral or normal positions.

In Fig. 5A, the control hand wheels 27 and 28 have been rotated from their normal vertical position to the inclined attitude through the angle $r$. The rotation of either one or both of the hand wheels 27 and 28, which it will be recalled are geared together through the central gear 13, and the idler pinions 26, can be accomplished without movement of the control arm 11, and the sheave 12, to which it is directly attached. The movement of the control wheels 27 and 28, accordingly, imparts rotation only to the sheave 15 which causes movement of the ends of the cable 23 and 23a into the positions indicated at the distance R away from the datum line O—O, corresponding to a predetermined displacement of the rudder from its neutral position.

Fig. 5B shows the relative position of the control arm 11 and the control wheels 27 and 28 in the position in which the arm has been rotated through the angle $a$ for a displacement of the ailerons without displacing the rudder from its neutral position. This is accomplished by tripping the trigger lock 30 in order to permit relative rotation of the control wheels 27 and 28 within the control arm 11 such that as the control arm 11 is rocked about its central longitudinal axis the control wheels 27 and 28 are maintained in the same vertical attitude relative to the vertical axis of the control column 10 in such manner that the interconnected gearing and the central shaft 14 upon which the rudder sheave 15 is attached all remain fixed in their original undisturbed neutral positions. Rotation of the control arm 11 through the angle $a$ requires that the control wheels 27 and 28, are caused to have the control arm 11 rotate relative to them, through the angle $v$ equivalent to the angle $a$, and by which the control arms 27 and 28 are maintained in their same vertical attitude. In other words, the control arm 11 only is rotated to reach the position shown in this figure and the aileron cables 19 and 19a are moved up and down respectively from the datum line O—O through the distance A corresponding to the control movement which has been transmitted to the aileron operating mechanism.

Assuming now that it is desired to concurrently move both the rudder and aileron surfaces by a coordinated two-control movement, this can be accomplished by maintaining the locked relationship of the wheel 27 with respect to the control arm 11 through the lock 30, and rotating the control arm through the angle $a$ corresponding to a control movement applied to the aileron cables 19 and 19a a distance indicated by the letter A above and below the datum line O—O. Inasmuch as the control wheels 27 and 28 are locked to control arm 11, they will impart like rotation to the central gear, which rotation is transmitted to the sheave 15 and the rudder control cables 23 and 23a to thereby apply a coordinated movement of a predetermined ratio to the rudder controls corresponding to the movement indicated by the letter R. Accordingly, when the control wheels 27 and 28 are locked to the control arm 11, the entire assembly acts as a single unit to control two control instrumentalities, namely, the rudder control and the aileron control and thereby provides a two-control means. It will, of course, be understood that in this cable-operated modification the cables preferably are locked or otherwise positively engaged with the sheaves in order that all control movements applied to the control arm 11 or its associated elements are positively transmitted through the control system to the respective control surface.

The modification shown in Figs. 6 to 9, inclusive, utilizes gearing for the positive transmission of the control forces to the control cables and in other respects embodies all of the features set forth in the cable-operated modification described above. The control column assembly 40 is comprised of the vertical tubular portion 40a, the base portion 40b on which has been formed the elevator sectors 40c, and the apertured hub portions 40d defining the transverse axis of the shaft 50 about which the column may be rocked in the fore and aft direction for elevator control movements. The upper terminal of the control column assembly is provided with a support portion 40e for the control arm assembly 41, which for the purposes of this description may be identical with the control arm assembly 11 and its associated elements, as described above.

As in the case of the modification of Fig. 1, the outer casing of the control arm 41 is fixed to the hollow shaft 42, which is suitably journalled within the control head portion 40e and has attached to its forward terminal the bevel gear 43. Similarly, the central gear within the control arm assembly 41 is fixed to the inner shaft 44 which has attached to its forward end the bevel gear 45. The bevel gears 43 and 45 are engaged with like bevel gears 46 and 47 which are fixed to the upper ends of the shafts 48 and 49, respectively. As in the case of the previous modification, it will be seen that either shaft 48 or 49 may be rotated independently of the other, or they may be simultaneously rotated with a coordinated movement obtained by locking the rudder hand wheels to the aileron control arm as described above.

The lower ends of the shafts 48 and 49 have attached to them the bevel gears 56 and 57, respectively, the upper bevel gear 56 being in continual meshing engagement with a similar bevel gear 58 extending toward the aileron control side, or to the right of the base portion in Fig. 7, and the lower bevel gear 57 is in similar meshing engagement with the corresponding bevel gear 59, driving the assembly for the rudder control as shown at the left side of the base portion in Fig. 7. The transverse pivot shaft 50, about which the base 40d of the column assembly is rockable, is supported at its end portions by the bearing bracket 51 and at its central portion by the bearing bracket 55, these brackets being suitably attached to the floor plate 52 as by the bolts 51a and 55a. Rocking of the column 40 imparts corresponding control movement to the elevator cable 53 guided by the sheaves 54. For the purpose of simplification of the description, it might be stated that the gearing assembly to the right in Fig. 7 for the ailerons is identical with that to the left for the rudder, being symmetrical except with respect to the large and small bevel gear units 58 and 59, which perform identical functions. Accordingly, a detailed description of the aileron gearing unit extending to the right in Fig. 7 and shown in greater detail in Fig. 8, will be sufficient for an understanding of the operation of the rudder gearing assembly.

Aileron control is obtained by rotating the main control arm 41 about the longitudinal axis of its shaft 42 thus imparting rotation to the bevel gears 43, 46, 56 and the idler gear 58. The bevel gear 58 has an integral spur gear portion 58a located within the housing of the aileron spur gear differential assembly 60 (see Fig. 8). The spur gear differential 60 has an integral or attached shaft portion 60a which is hollow and is rotatably mounted upon the main pivot shaft 50. The differential shaft 60a extends through the base supporting portion 40c and its bearing part 40d toward the right and outside of the base portion adjacent to the outer support 50 at which it has fixedly attached thereto the cable drum 60b about which the aileron control cable 69 is wrappingly engaged. The spur gears 62 and 62a are pivotally mounted on the shafts 64 within the differential housing 60, being in meshing engagement with the spur gear 58a and drive between the gear 58a and the spur gears 61 and 61a, which are also pivotally mounted in the differential housing 60 on shafts 63, and through the idler gears 65a and 65b in mesh with the pinions 66 and 67, are geared to the elevator quadrant toothed portion 40f. Within the differential housing 60, there is a cross-rib or spoke element 60c, as more clearly shown in Fig. 9, and which supports the central hub portion within which the shaft 50 is journalled. The pinions 66 and 67, which are intermeshing and are also meshed with the gear 65b and the elevator sector 40f, are supported by the member 68 which is in turn attached to the support plate 52. Similarly, the gearing assembly on the opposite side of the base portion for the rudder control is provided with a differential assembly 70 internally driven by an integral or attached extension of the bevel gear 59. The gearing within the differential assembly 70 also includes a spur gear integrally attached to the outer spur gear assembly 75 engaging the spur pinions 76 and 77 pivotally mounted upon the supporting frame 78 and meshing engagement with the toothed sector 40f for the elevator control on the opposite side of the base portion 40b.

With the arrangement shown in Fig. 8, and supplemented by Fig. 9, when the aileron and rudder controls are fixed and the column 40 is swung or rocked forwardly to lower the elevator, the elevator quadrant 40f rotates counterclockwise as viewed in Fig. 6 and the spur gear 58 is rotated in the counterclockwise direction with the column 40. As the column is swung forward, the bevel gear 56, rotating about the axis of the shaft 50, rotates the gear 58 in the counterclockwise direction and the latter rotates the spur gear 62 in the clockwise direction. The rotary motion of the elevator quadrant 40f and the aileron drive gear 58 thus cancel out at the spur gears 62 and 61 so that the differential housing 60 and the aileron drum 60b remain fixed. A similar action also occurs in the rudder drive side of the assembly due to the effect of the differential 70 for controlled movement of the rudder cable 71.

When the control column 40 is held stationary to fix the elevator position, and the aileron control is operated by rotation of the control arm 41 about the axis of its tubular shaft 42, the elevator quadrant 40f fixes the gears 67, 66 and 65 such that rotation of the aileron drive gear 58 causes rotation of the spur gears 62 and 62a rotating in turn the spur gears 61 and 61a around the gear 65a and carrying with it the differential housing 60 and the aileron drum 60b to which the differential housing 60 is fixed. In other words, when the column 40 is not rocked or moved for aileron control, the fixed gear sector 40f, in preventing rotation of the gears 65, 66 and 67, causes the aileron gear 58 to positively transmit any aileron control movements, applied to the control arm 41, directly to the aileron drum 60b on which the aileron cables 69 are wound. The rudder control portion of the differential gearing in the control column base will operate in a similar manner to operate the rudder cable 71 and it will be understood that both the aileron and rudder controls may be simultaneously operated by manual control of the elements 11, 27 and 28 as shown in the previously described Fig. 5C.

It will, accordingly, be noted that the two forms of the presently disclosed control column are readily adapted for either two or three control operation of an airplane, or other similar vehicle. By means of the improved control column either simple aileron control is accomplished by direct rotation of the outer wheel about its axis or simple rudder motion is accomplished by a rotation of the inner wheels about their parallel horizontal axes. The trigger lock-in and lock-out device gives fixed coordination of the aileron and rudder controls by means of an instantaneous thumb trigger latch. The controls are arranged in a convenient set-up and the motions required to be made are instinctive to pilots or the operators of vehicles.

Other forms and modifications of the present invention, both with respect to its general arrangement and the details of its several parts, are intended to fall within the scope and spirit of this invention as more particularly defined in the appended claims.

We claim:

1. In an aircraft having a plurality of control surfaces, a control element mounted for pivotal movement about a longitudinal axis, means for transmitting pivotal movement of said control element about said longitudinal axis to one of the control surfaces of the aircraft, a pair of control wheels rotatively mounted upon said control element upon longitudinal axes one on each side of said longitudinal axis for movements with and with respect to said control element, means for transmitting control movements from either of said control wheels to a further control surface of the aircraft and manual means carried by either of said control wheels selectively operable for interlocking said control wheel with said control element for the simultaneous coordinated operation of all of the said control surfaces of the aircraft.

2. A control mechanism for aircraft comprising a control column pivotally mounted upon a transverse axis with respect to the aircraft and connected to an elevator surface, control means pivotally mounted upon the upper end of said control column upon a longitudinal axis with respect to the aircraft and connected to the aileron surfaces of the aircraft, rudder control means rotatably mounted upon said aileron control means upon an axis eccentrically disposed with respect to said longitudinal axis for relative movement with and with respect to said aileron control means, said rudder control means operatively connected to a rudder surface of the aircraft, and manual means carried by said rudder control means selectively operative for interlocking said rudder control means with said aileron control means for the simultaneous coordinated operation of said aileron and rudder surfaces.

3. In an aircraft control system, a control column pivotally mounted upon a horizontal transverse axis with respect to the aircraft, aileron control means pivotally mounted upon a longitudinal horizontal axis with respect to the aircraft, said longitudinal axis carried by an upper portion of said control column, means operatively connecting said aileron control means with the aileron surfaces of the aircraft including a hollow shaft journalled upon said longitudinal axis within said upper portion of said control column, rudder control means including an annular control element rotatively mounted upon said aileron control means on an axis eccentrically disposed with respect to said longitudinal axis, said annular control element having a diametrically disposed grip portion, and operating means including gear elements in engagement with said rudder control annular element, said gear means including a gear coaxially mounted upon said longitudinal axis of said aileron pivotal mounting and said hollow shaft for transmitting rudder control forces from said annular control element to a rudder surface of the aircraft.

4. In an aircraft, the combination with a control column pivotally mounted for rocking movements on an axis transverse of the aircraft and a laterally extending aileron control arm pivotally carried upon said control column for rotation about a fore and aft axis, of a rudder control element rotatably mounted upon a laterally extending portion of said control arm eccentrically of the fore and aft axis thereof for rotative movements with and with respect to said control arm and manual means carried by said rudder control element selectively operable for interconnecting said rudder control element with said aileron control arm for the simultaneous coordinated operation of the aileron and rudder instrumentalities of the aircraft.

5. In an aircraft control system including a control column pivotally mounted for rocking movements about a first axis transversely disposed with respect to the aircraft, and an aileron control arm mounted for rocking movements about a longitudinal pivot disposed on a second longitudinally extending axis carried by said control column; rudder control means including a pair of interconnected annular elements rotatively mounted for relative movement within said aileron control arm with one of said annular elements on either side of said longitudinal pivots and about spaced longitudinal axes separate from said first and second axes, at least one of said annular elements having a portion formed thereon arranged to be grasped by the hand of an operator for independent or simultaneous movements of said portion about each of said axes and manual means carried by said rudder control means selectively operative for interlocking said rudder control means with said aileron control arm for the simultaneous coordinated operation of said aileron and rudder control instrumentalities.

6. The combination with a control column pivotally mounted for rocking movements on a transverse axis with respect to the aircraft and a laterally extending aileron control arm pivotally carried upon said control column for rotation about a fore and aft axis, of a rudder control member rotatably mounted upon said control arm on a third axis eccentrically of the fore and aft axis of said aileron control arm, said rudder control member arranged for manually rotative movements both with and with respect to said aileron control arm and manual means carried by said rudder control member selectively operative for interlocking said rudder control member with said aileron control arm for the simultaneous coordinated operation of said aileron and rudder control surfaces.

7. An aircraft system for the control of at least three separate control instrumentalities comprising a control column pivotally mounted for rocking movements about a transverse axis with respect to the aircraft for the control of a first of said instrumentalities, a control arm mounted for rocking movements about a longitudinal pivot axis carried by said control column, said control arm operatively connected to a second of said control instrumentalities for the control of a second of said instrumentalities upon said rocking movement about said longitudinal pivot axis, and control means including a control element rotatably mounted upon said control arm upon an axis eccentrically disposed with respect to said longitudinal pivot axis for the control of a third of said instrumentalities, a grip portion formed upon said control arm contiguous to a grip portion formed on said control element arranged to be grasped by the hand of an operator in such manner that longitudinal pushing and pulling movements of the hand controls said first instrumentality, raising or lowering movements of the hand controls said second instrumentality, twisting of said hand controls said third instrumentality without in either case affecting the other said instrumentalities, and a movement of the hand combining components of said movements provides for the simultaneous control of all three said instrumentalities.

8. In an aircraft control system including a vertically disposed control column pivotally mounted for fore and aft rocking movements about an axis transverse of the aircraft and a control arm mounted for rocking movements in a transverse direction about a longitudinal pivot axis carried by an upper portion of said control column, said control arm operatively connected to a control instrumentality of the aircraft, control means including a series of intermeshing toothed elements rotatively mounted upon said control arm upon separate transversely spaced longitudinally extending axes for relative movement with respect to said control arm, one of said toothed elements being disposed on either side of said longitudinal pivot axis, and a further toothed element of said series co-axially mounted upon said longitudinal pivot axis and operatively connected to a further control instrumentality of said system.

9. In an aircraft control system having a plurality of control instrumentalities, a control column mounted for fore and aft rocking movements upon an axis transversely disposed with respect to the aircraft, a control arm pivotally carried upon said control column for rotation about a fore and aft axis, a toothed control member rotatably mounted at its periphery upon said control arm on an axis eccentrically disposed with respect to said fore and aft axis for independent rotative movement with respect to said control arm, said rotatable control member being hubless and having an annular rim portion, said control member having a diametral grip portion extending across between said annular rim portion, toothed means journalled within said control arm and co-axially mounted with respect to said control arm fore and aft pivot axis, said toothed means in meshing rotational engagement with said control member for transmitting control movements from said control member to one of said control instrumentalities, and locking means operatively mounted upon said control member grip portion for selectively engaging said control arm for the separate and coordinated operation of two of said control instrumentalities.

10. In an aircraft having a plurality of control surface instrumentalities, control mechanism including a control column pivotally mounted upon a transverse axis with respect to the aircraft and connected to a first control surface instrumentality, a control element pivotally mounted upon said control column upon a longitudinal axis and connected to a second surface instrumentality, control means including a train of intermeshing gear elements rotatably mounted upon said control element, one of said gear elements having a peripheral rim portion journalled within said control element arranged for manual rotation with respect to said control element upon an axis spaced from said longitudinal axis for the manual control of a third control surface instrumentality, and selective locking means cooperatively carried by said control element and said gear element rim portion for locking said rim portion at a plurality of positions with respect to said control element whereby said third control surface instrumentality may be manually controlled independently of said second control surface instrumentality and also conjointly controlled with a plurality of predetermined ratios of coordinated control with said second control surface instrumentality.

11. In an aircraft control system having elevator, aileron and rudder control instrumentalities, the combination with a control column mounted for fore and aft rocking movements upon a transverse axis for the control of said elevator instrumentality and a control arm pivotally carried upon said control column for rotation about a fore and aft axis, means operatively connecting said control arm with said aileron control instrumentality arranged upon rotation of said control arm about said fore and aft axis to operate said aileron control instrumentality, of a control member rotatively mounted upon said control arm on an axis eccentrically disposed with respect to said fore and aft axis for independent rotative movements with respect to said control arm, and transmission means rotatably mounted upon and coaxially mounted with respect to said control arm fore and aft pivot axis in rotational engagement with said eccentrically disposed control member and with said rudder control instrumentality for transmitting control movements from said control member to said rudder control instrumentality of the aircraft control system.

12. In aircraft having elevator, aileron and rudder control instrumentalities, control mechanism including a control column pivotally mounted upon a transverse axis and operatively connected to said elevator control instrumentality, a control element pivotally mounted upon said control column upon a longitudinal axis, means operatively connecting said control element to said aileron control instrumentality for the operation of said aileron control instrumentality upon pivotal movement of said control element about said longitudinal axis, and control means including a train of intermeshing gears rotatably mounted upon said control element, one of said gears having a peripheral rim portion journaled within said control element arranged for manual rotation with respect to said control element upon an axis laterally spaced from said longitudinal axis for the manual control of said rudder control instrumentality both independently of and conjointly with the said aileron control instrumentality.

13. In an aircraft having aileron and rudder control surfaces, the combination with a control column pivotally mounted upon the aircraft for rocking movements on a transverse axis only and a laterally extending control arm pivotally carried upon said control column for rotation about a longitudinal axis, means operatively connecting said control arm with the aileron control surfaces of the aircraft arranged upon rotation of said control arm about said longitudinal axis to operate said aileron control surfaces, of a control member rotatably mounted upon said control arm upon a separate axis eccentrically disposed with respect to the longitudinal axis of said control arm, said control member having a manual grip portion contiguous to a grip portion upon said control arm, further means operatively connecting said control member grip portion to the rudder control surface of the aircraft arranged for the operation of said rudder control surface, said grip portions of said control member and said control arm arranged for selective movement of said control member both with and with respect to said control arm for the coordinated operation of said aileron and rudder control surfaces of the aircraft.

14. In an aircraft system for the control of the elevator, aileron and rudder instrumentalities, a control column pivotally mounted for rocking movements with respect to the aircraft about a transverse axis only for the control of the elevator instrumentality, a control arm mounted for rocking movements about a longitudinal pivot axis carried by said control column, said control arm operatively connected to said aileron instrumentality for the control thereof upon rocking movement about said longitudinal pivot axis, and rudder control means including a control element rotatably mounted upon said control arm upon an axis eccentrically disposed with respect to said longitudinal pivot axis, transmission means having a tubular element coaxially mounted upon said longitudinal axis and in rotational engagement with said control element whereby said control element and said rudder control means is operatively connected to the rudder control instrumentality for the operation thereof, said control element having a portion arranged to be grasped by the hand of an operator in such manner that longitudinal pushing or pulling movement of said hand provides control of said elevator instrumentality by rocking movement of said control column about said transverse axis, the raising or lowering of said hand provides control of said aileron instrumentality by rocking movement of said control arm about said longitudinal pivot axis and the twisting of said hand within a vertical transverse plane provides control of said rudder instrumentality through the medium of said transmission means without the necessity in either case of affecting the other said control instrumentality.

CHARLES H. DAVIES.
    ROY V. OSTLING.

References Cited in the file of this patent

UNITED STATES PATENTS

| Number | Name | Date |
|---|---|---|
| 1,806,343 | Geyer | May 19, 1931 |
| 1,877,499 | De Bernardi | Sept. 13, 1932 |
| 1,891,208 | Schuetz | Dec. 13, 1932 |
| 2,063,812 | James | Dec. 8, 1936 |
| 2,455,584 | Jamison | Dec. 7, 1948 |
| 2,505,020 | Weisman | Apr. 25, 1950 |
| 2,507,600 | Kaiser et al. | May 16, 1950 |
| 2,560,112 | Kendall | July 10, 1951 |

FOREIGN PATENTS

| Number | Country | Date |
|---|---|---|
| 216,594 | Great Britain | June 4, 1924 |
| 431,648 | Great Britain | July 12, 1935 |